(12) United States Patent
Wu et al.

(10) Patent No.: US 11,269,097 B2
(45) Date of Patent: Mar. 8, 2022

(54) COMPUTING AMPLITUDE INDEPENDENT GRADIENT FOR SEISMIC VELOCITY INVERSION IN A FREQUENCY DOMAIN

(71) Applicant: Saudi Arabian Oil Company, Dhahran (SA)

(72) Inventors: Yan Wu, Beijing (CN); Yue Ma, Beijing (CN); Lei Cao, Beijing (CN); Hongwei Liu, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 971 days.

(21) Appl. No.: 15/956,261

(22) Filed: Apr. 18, 2018

(65) Prior Publication Data

US 2018/0335530 A1   Nov. 22, 2018

Related U.S. Application Data

(60) Provisional application No. 62/509,300, filed on May 22, 2017.

(51) Int. Cl.
*G01V 1/30* (2006.01)
*G01V 1/28* (2006.01)
*G01V 1/36* (2006.01)

(52) U.S. Cl.
CPC .............. *G01V 1/282* (2013.01); *G01V 1/303* (2013.01); *G01V 1/362* (2013.01);
(Continued)

(58) Field of Classification Search
CPC ........ G01V 1/282; G01V 1/303; G01V 1/362; G01V 2210/52; G01V 2210/614; G01V 2210/6222
See application file for complete search history.

(56) References Cited

U.S. PATENT DOCUMENTS 5,570,321 A   10/1996   Bernitsas
5,583,825 A * 12/1996   Carrazzone ............ G01V 1/306
                                                         367/31
(Continued)

FOREIGN PATENT DOCUMENTS

CN   101630018   1/2010
CN   105005076   10/2015
(Continued)

OTHER PUBLICATIONS

International Search Report and Written Opinion issued in International Application No. PCT/US2018/033828 dated Sep. 11, 2018, 16 pages.
(Continued)

*Primary Examiner* — Krystine E Breier
(74) *Attorney, Agent, or Firm* — Fish & Richardson P.C.

(57) ABSTRACT

A method for computing amplitude independent gradient for seismic velocity inversion in a frequency domain includes receiving seismic data associated with a region. The region comprises one or more earth subsurface layers represented by a plurality of points, and each point is associated with a seismic velocity. Seismic velocities at the plurality of points are determined by iteratively updating the seismic velocities based on a plurality of gradient values, where each gradient value corresponds to a point and is determined by evaluating a gradient of an objective function at a location of the point. A seismic image of the one or more earth subsurface layers is displayed based on the determined seismic velocities.

14 Claims, 6 Drawing Sheets

(52) U.S. Cl.
CPC .... *G01V 2210/52* (2013.01); *G01V 2210/614* (2013.01); *G01V 2210/6222* (2013.01)

(56) References Cited

U.S. PATENT DOCUMENTS

| | | | | |
|---|---|---|---|---|
| 7,072,767 | B2* | 7/2006 | Routh | G01V 1/28 |
| | | | | 702/14 |
| 9,075,159 | B2* | 7/2015 | Washbourne | G01V 1/30 |
| 9,470,811 | B2* | 10/2016 | Sun | G01V 1/282 |
| 10,288,751 | B2* | 5/2019 | Keers | G01V 1/282 |
| 10,436,927 | B2* | 10/2019 | Sun | G01V 1/282 |
| 10,459,096 | B2* | 10/2019 | Tan | G06F 17/11 |
| 10,739,478 | B2* | 8/2020 | Coates | G01V 1/28 |
| 10,871,584 | B2* | 12/2020 | Jiao | G01V 1/282 |
| 2002/0141287 | A1 | 10/2002 | Lazaratos | |
| 2010/0142316 | A1 | 6/2010 | Keers et al. | |
| 2011/0090760 | A1 | 4/2011 | Rickett et al. | |
| 2012/0316791 | A1* | 12/2012 | Shah | G01V 1/282 |
| | | | | 702/14 |
| 2015/0293246 | A1* | 10/2015 | Dickens | G01V 1/307 |
| | | | | 702/18 |
| 2018/0164453 | A1* | 6/2018 | Esser | G01V 11/00 |

FOREIGN PATENT DOCUMENTS

| | | |
|---|---|---|
| GB | 2538804 | 11/2016 |
| WO | 2009136708 | 11/2009 |
| WO | 2013009944 | 1/2013 |
| WO | WO 2016193180 | 12/2016 |

OTHER PUBLICATIONS

GCC Examination Report in GCC Application No. GC 2018-35353, dated Mar. 26, 2020, 3 pages.

Gulf Cooperation Council Examination Report issued in GCC Application No. GC 2018-35353 dated Nov. 24, 2019, 5 pages.

Alkhalifah and Choi, "From tomography to FWI with a single objective function," Geophysics vol. 79, No. 2, R55-R61, Mar.-Apr. 2014, 7 pages.

Luo and Schuster, "Wave-equation travel time inversion," Geophysics vol. 56, No. 5, May 1991, 9 pages.

Shin and Min, "Waveform inversion using a logarithmic wavefield," Geophysics vol. 71, No. 3, R31-R42, May-Jun. 2006, 12 pages.

Van Leeuwen and Mulder, "A correlation-based misfit criterion for wave-equation travel time tomography," Geophysical Journal International vol. 182, Sep. 2010, 12 pages.

Zhang and Wang, "Travel time information-based wave-equation inversion," Geophysics vol. 74, No. 6, WCC27-WCC36, Nov.-Dec. 2009, 10 pages.

CN Office Action from Chinese Appln. No. 201880040427.0, dated Nov. 15, 2021, 15 pages, with English Translation.

* cited by examiner

FIG. 6

COMPUTING AMPLITUDE INDEPENDENT GRADIENT FOR SEISMIC VELOCITY INVERSION IN A FREQUENCY DOMAIN

CROSS REFERENCE TO RELATED APPLICATIONS

This application claims priority to U.S. Application Ser. No. 62/509,300 filed on May 22, 2017, the entire contents of which is hereby incorporated by reference.

TECHNICAL FIELD

This disclosure relates to seismic data processing.

BACKGROUND

Velocity inversion is typically used to build a reliable seismic velocity model for a target region, which can be used in imaging a subsurface structure of the target region. A widely used velocity inversion method is ray tomography which makes use of traveltime information in recorded seismic data. However, the ray tomography usually requires manually picking arrival events which is time consuming and in practical often makes three-dimensional model building unafforadable. In addition, ray based inversion cannot handle a complex region, for example, a region of a complicated subsurface structure. Wave-equation based inversion methods are also used. However, full waveform inversion suffers a cycle skipping problem which makes velocity inversion end up at a local minimum. Inversion with a cross-correlation based misfit function has significant artifacts in gradients which slow down a rate of converging to a true velocity model. Therefore, the existing inversion methods are either time consuming or unreliable.

SUMMARY

The present disclosure describes methods and systems, including computer-implemented methods, computer program products, and computer systems for computing amplitude independent gradient for seismic velocity inversion in a frequency domain.

In an implementation, seismic data associated with a region is received, where the region comprises one or more earth subsurface layers represented by a plurality of points, and each point is associated with a seismic velocity. Seismic velocities at the plurality of points are determined by iteratively updating the seismic velocities based on a plurality of gradient values, where each gradient value corresponds to a point and is determined by evaluating a gradient of an objective function at a location of the point. A seismic image of the one or more earth subsurface layers is generated and displayed based on the determined seismic velocities.

The previously-described implementation can be implemented using a computer-implemented method, a non-transitory, computer-readable medium storing computer-readable instructions to perform the computer-implemented method, and a computer-implemented system comprising a computer memory interoperably coupled with a hardware processor configured to perform the computer-implemented method/the instructions stored on the non-transitory, computer-readable medium.

The subject matter described in this disclosure can reliably determine seismic velocities of a target region by efficiently and effectively processing seismic data in a frequency domain. The described approach iteratively updates the velocities based on gradients of an objective function that are independent of influence of amplitude changes in the seismic data. The described approach can quickly converge to true velocities independent of quality of initial velocity estimates. The determined seismic velocities can be used to generate a seismic image of the target region. The generated seismic image can be used for effective oil and gas exploration, such as determining drilling parameters for hydrocarbon wells. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes computing amplitude independent gradient for seismic velocity inversion in a frequency domain and is presented to enable any person skilled in the art to make and use the disclosed subject matter in the context of one or more particular implementations. Various modifications, alterations, and permutations of the disclosed implementations can be made and will be readily apparent to those skilled in the art. The general principles defined in the disclosed implementations may be applied to other implementations and applications without departing from scope of the disclosure. Thus, the present disclosure is not intended to be limited to the described or illustrated implementations, but is to be accorded the widest scope consistent with the principles and features disclosed.

Seismic data can be collected for a target region including one or more subsurface layers by sending seismic waves to the target region at multiple source locations and recording reflected waves at multiple receiver locations. The seismic data can be used to build a velocity model, for example, a three-dimensional velocity model, for analyzing a subsurface structure of the target region. The velocity model can include seismic wave velocities at different locations in the target region.

At a high level, the described approach determines seismic velocities in a target region from recorded seismic data in a frequency domain using time shift (or traveltime) information. The described approach iteratively updates a velocity model based on gradients of an objective function (or a misfit function). For a quick convergence to true velocities (for example, final estimated velocities within a predetermined threshold from true velocities can be found within a threshold number of iterations) independent of quality of initial velocity estimates, the objective function is based on a cross-correlation between recorded seismic data and synthetic seismic data generated using estimated velocities during the iteration. The objective function is expressed in a frequency domain so that traveltime information can be easily extracted. When deriving the gradient of the objective function, amplitude information and traveltime information are separated, and amplitude information (that is, influence of amplitude or power spectrum on velocity inversion) is neglected. The resultant gradient is purely dependent on kinematical information embedded in the recorded seismic data. The described approach enables an automatic velocity inversion of a good global convergence.

Figure 1:
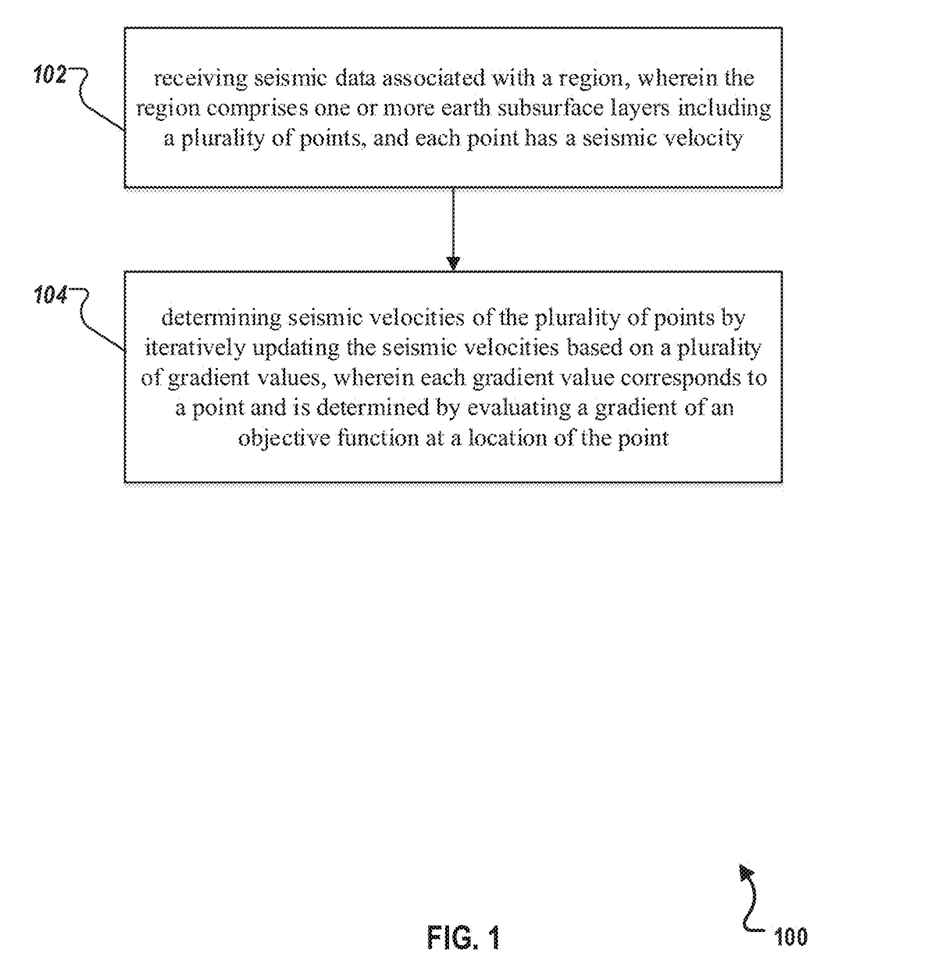
FIG. 1 is a flowchart of an example method for computing amplitude independent gradient for seismic velocity inversion in a frequency domain, according to some implementations.

FIG. 1 is a flowchart of an example method 100 for computing amplitude independent gradient for seismic velocity inversion in a frequency domain, according to some implementations. For clarity of presentation, the description that follows generally describes method 100 in the context of the other figures in this disclosure. For example, method 100 can be performed by a computer system described in FIG. 6. However, it will be understood that method 100 may be performed by a system, an environment, software, hardware, or a combination of systems, environments, software, and hardware as appropriate. In some implementations, various steps of method 100 can be run in parallel, in combination, in loops, or in any order.

The method 100 starts at block 102 where seismic data associated with a region is received. The region can include one or more earth subsurface layers represented by multiple points or locations. Each point can be associated with a seismic velocity representing a seismic wave velocity when a seismic wave propagates through the point. For example, the region can be a three-dimensional (3D) region of a length 2 kilometers (km), a width 2 km, and a depth 2 km. If the region is divided into 10 meters (m) by 10 m by 10 m cubes, the region can be represented by $201^3$ cube corner points. In other words, seismic velocities of the region can be represented by the velocities at these $201^3$ points or locations. Other methods can also be used to find a set of points or locations representing the region.

The seismic data can be received by a number of receivers (for example, geophones or hydrophones) positioned on or below the earth surface. A seismic source can send seismic waves into the target region, and the receivers can record waves reflected by the target region. The seismic source can be, for example, towed by a truck and generate seismic waves at different locations. For example, the seismic source can fire a first shot at a first location for receivers to record reflected waves, and the seismic source moves to a second location to fire a second shot. The recorded data at each receiver corresponding to a single shot is called a trace. For instance, if the seismic source fired shots at 100,000 different locations and there are 1,000 receivers, the resultant seismic data set can have $10^8$ traces.

Figure 2:
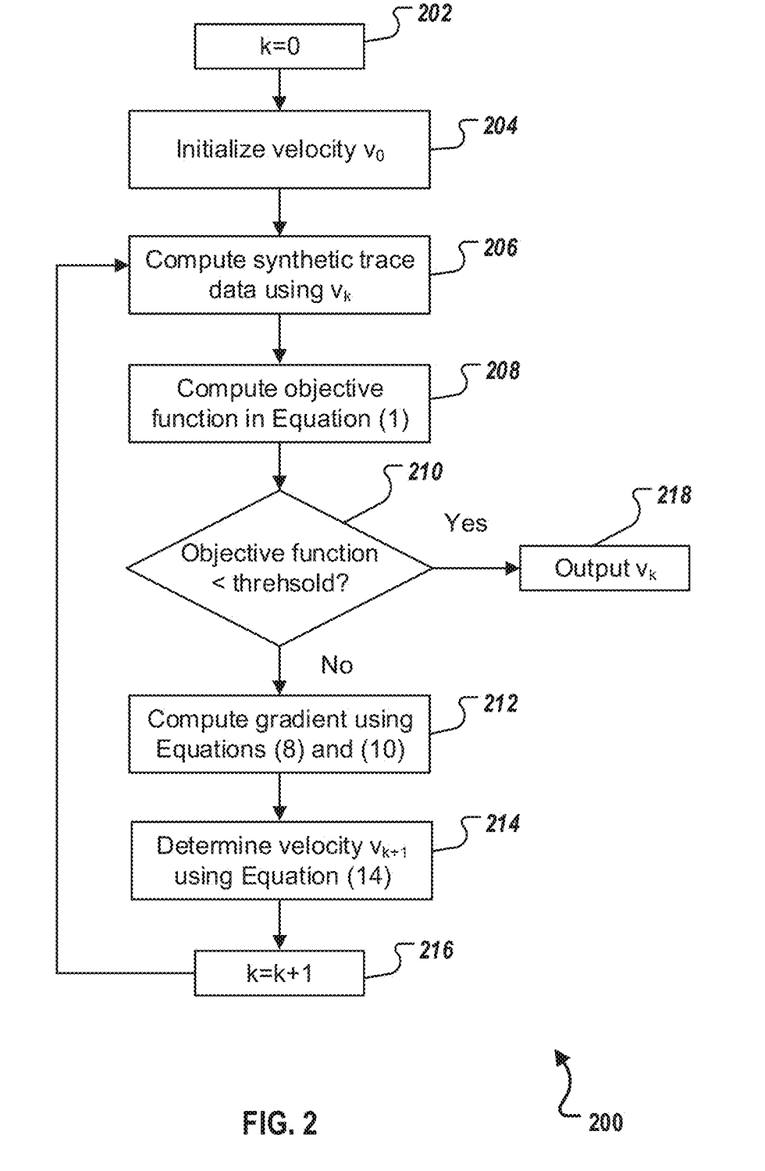
FIG. 2 is a flowchart of an example method for iteratively updating a velocity model, according to some implementations.

At block 104, seismic velocities at the multiple points in the target region are determined by iteratively updating the seismic velocities based on multiple gradient values. Each gradient value corresponds to a point and is determined by evaluating a gradient of an objective function at a location of the point. FIG. 2 shows detailed operations of block 104.

FIG. 2 is a flowchart of an example method 200 for iteratively updating a velocity model, according to some implementations. For clarity of presentation, the description that follows generally describes method 200 in the context of the other figures in this disclosure. For example, method 200 can be performed by a computer system described in FIG. 6. However, it will be understood that method 200 may be performed by a system, an environment, software, hardware, or a combination of systems, environments, software, and hardware as appropriate. In some implementations, various steps of method 200 can be run in parallel, in combination, in loops, or in any order.

The method 200 starts at block 202 where an iteration counter k is initialized as zero.

At block 204, an initial velocity model $v_0$ is generated for the target region. For example, if the target region can be represented by $201^3$ points, an initial velocity is estimated for each point, and the initial velocity model includes the $201^3$ initial velocities. In some implementations, the initial velocity estimate at each point can be a normal moveout (NMO) velocity or other velocity estimates.

At block 206, synthetic seismic data (or synthetic data traces) is computed for the target region using $v_k$, that is, the estimated velocity model from the kth iteration. For example, the initial synthetic seismic data is generated based on the initial velocity model $v_0$. In some implementations, the synthetic traces can be calculated by numerically simulating acoustic wave field propagation using the velocity model $v_k$.

At block 208, a value of an objective function in Equation (1) is calculated, where the objective function is based on a cross-correlation between the recorded data traces and the synthetic traces $$J = \frac{1}{2} \sum_{x_s, x, \omega} \left| \frac{\partial \overline{C}}{\partial \omega} \right|^2, \quad (1)$$

where $\overline{C}$ is $\overline{C}(x, \omega; x_s)$ expressed as $$\overline{C}(x,\omega;x_s) = d^*(x,\omega;x_s)p(x,\omega;x_s) = \int C(x,\tau;x_s)e^{j\omega\tau}d\tau, \quad (2)$$

and $$C(x,\tau;x_s) = \int d(x,t+\tau;x_s)p(x,t;x_s)dt, \quad (3)$$

where $\tau$ is a time shift, $\omega$ is an angular frequency, $d(x,\omega;x_s)$ and $d(x,t;x_s)$ are the recorded data trace at the source location $x_s$ and the receiver location x in a frequency domain and a time domain, respectively, $p(x,\omega;x_s)$ and $p(x,t;x_s)$ are the synthetic data trace at the source location $x_s$ and the receiver location x in a frequency domain and a time domain, respectively, and * represents a conjugate operation. For the earlier example of $10^8$ recorded traces, $10^8$ synthetic traces can be generated based on the velocity model at the kth iteration, $v_k$. Based on the $10^8$ recorded traces and $10^8$ synthetic traces, a value J of the objective function in Equation (1) can be computed.

At block 210, a determination is made whether the value J of the objection function is less than a predetermined threshold. If J is less than the threshold, method 200 proceeds to block 218 where the velocity model $v_k$ is outputted as a final velocity model. If J is equal to or greater than the threshold, method 200 proceeds to block 212 for further updating the velocity model.

At block 212, gradients of the objective function in Equation (1) are computed for designated points or locations representing the target region. In other words, a gradient can be computed for each point representing the target region. To derive the gradient of the objective function, $d(x,\omega;x_s)$ and $p(x,\omega;x_s)$ can be expressed as $d(x,\omega;x_s)=A_d(x,\omega;x_s)e^{\phi_d(x,\omega;x_s)}$ and $p(x,\omega;x_s)=A_p(x,\omega;x_s)e^{\phi_p(x,\omega;x_s)}$, respectively, where $A_d$ and $A_p$ represent the amplitude of the recorded trace and the synthetic trace, respectively, and $\phi_d$ and $\phi_p$ represent the phase of the recorded trace and the synthetic trace, respectively. Therefore, $\overline{C}(x,\omega;x_s)$ in Equation (2) can be expressed as $$\overline{C}(x,\omega;x_s) = A_c(x,\omega;x_s)e^{\Delta\phi(x,\omega;x_s)}, \tag{4}$$

where $$A_c(x,\omega;x_s) = A_d(x,\omega;x_s)A_p(x,\omega;x_s),$$

and $$\Delta\phi(x,\omega;x_s) = \phi_p(x,\omega;x_s) - \phi_d(x,\omega;x_s).$$

The gradient of the objective function in Equation (1) at a target point x' in the frequency domain can be expressed as $$g(x') = \sum_{x_s,x,\omega} \left(\frac{\partial \overline{C}}{\partial \omega}\right)^* \frac{\partial}{\partial \omega} \frac{\partial \overline{C}}{\partial v(x')}. \tag{5}$$

where x' represents a location of the target point (for example, Cartesian coordinates), $$\left(\frac{\partial \overline{C}}{\partial \omega}\right)^*$$

represents a residual and $$\frac{\partial \overline{C}}{\partial v}$$

provides a wave path along which the residual can be back propagated in computing the gradient. By substituting Equation (4) into the wave path $$\frac{\partial \overline{C}}{\partial v},$$

the following expression is obtained:

$$\frac{\partial \overline{C}}{\partial v} = \overline{C}\left(\frac{1}{A_c}\frac{\partial A_c}{\partial v} + \frac{\partial \Delta\phi}{\partial v}\right). \tag{6}$$

Equation (6) mixes the amplitude- and phase-related components, hence the gradient in Equation (5) cannot provide a reliable gradient, as will be explained later. In the described approach, amplitude changes are neglected (that is, neglecting the term $$\frac{1}{A_c}\frac{\partial A_c}{\partial v}$$

in Equation (6)) and a frequency-independent time shift is assumed, that is, $\Delta\phi(x,\omega;x_s)=i\omega\Delta\tau(x;x_s)$. As a result, by using a Rytov approximation, Equation (6) becomes $$\frac{\partial \overline{C}}{\partial v} \approx \overline{C}\frac{\partial \Delta\phi}{\partial v} = i\omega\overline{C}\frac{\partial \Delta\tau}{\partial v}. \tag{7}$$

By substituting Equation (7) into Equation (5), the gradient can be expressed as $$g(x') = \sum_{x_s,x,\omega} \left(\frac{\partial \overline{C}}{\partial \omega}\right)^* i\overline{C}\frac{\partial \Delta\tau}{\partial v(x')}, \tag{8}$$

where $\Delta\tau$ is a time shift between the recorded and synthetic data and satisfies $$\dot{C}(x,\Delta\tau;x_s) = \frac{\partial}{\partial \tau}C(x,\tau;x_s)\bigg|_{\tau=\Delta\tau} = 0.$$

According to a rule for an implicit function derivative, $$\frac{\partial \Delta\tau}{\partial v}$$

in Equation (8) can be expressed as:

$$\frac{\partial \Delta\tau}{\partial v} = -\frac{\partial \dot{C}}{\partial v}\bigg/\frac{\partial \dot{C}}{\partial \Delta\tau} = \tag{9}$$

$$-\frac{1}{E}\int(-i\omega)[d(x,\omega)G^*(x',\omega;x)]^*f(\omega)G(x',\omega;x_s)e^{-i\omega\Delta\tau}d\omega,$$

where E is $E(x,x_s)=\int(-\omega^2)\overline{C}(x,\omega;x_s)e^{-i\omega\Delta\tau}d\omega$ which is independent of the target point location x', $f(\omega)$ represents the source wavelet generate by the seismic source (for example, a Ricker wavelet), and $G(y,\omega;x)$ is a Green function which denotes an observed wavefield at location y due to an impulse source at location x. Note that it is not necessary to determine $\Delta\tau$, because in the described approach, as discussed earlier, the amplitude changes are neglected (in other words, $A_d(x,\omega;x_s)=A_p(x,\omega;x_s)$) and $d(x,\omega;x_s)$ is a time-shifted version of $p(x,\omega;x_s)$, that is, $p(x,\omega;x_s)=e^{i\omega\Delta\tau}d(x,\omega;x_s)$. Therefore, Equation (9) becomes the following:

$$\frac{\partial \Delta\tau}{\partial v(x')} = -\frac{1}{E}\int i\omega^3[p(x,\omega;x_s)G^*(x',\omega;x)]^*f(\omega)G(x',\omega;x_s)d\omega, \tag{10}$$

where E is $E(x,x_s)=\int(-\omega^2)p^*(x,\omega;x_s)p(x,\omega;x_s)d\omega$. In some implementations, the gradient can be computed by Equations (8) and (10) using a finite difference method or other methods.

Note that the new residual can be expressed as $$\sum_\omega \left(\frac{\partial \overline{C}}{\partial \omega}\right)^* i\overline{C} = \sum_\tau \tau C^2(x, \tau). \quad (11)$$

Equation (11) automatically honors Δτ by summation, and clearly indicates the velocity error information. The sign of Δτ or Equation (11) indicates whether the estimated velocity is higher or lower than the true velocity. Note that the gradient in Equation (8) cannot be obtained from the following conventional formulation in Equations (12) and (13) where the amplitude and phase information cannot not be explicitly separated in the time domain:

$$J = \frac{1}{2} \sum_{x_s, x, \tau} \tau^2 C^2(x, \tau; x_s), \quad (12)$$

$$g(x') = \sum_{x_s, x, \omega} \tau^2 C \frac{\partial C}{\partial v(x')}. \quad (13)$$

In sum, for each point location x', the gradient g(x') can be computed using Equations (8) and (10). For example, if the target region has $201^3$ points, $201^3$ gradients are computed.

At block 214, the velocity at each point is updated using a steepest descent method as shown in Equation (14)

$$v_{k+1}(x') = v_k(x') + \alpha_k \gamma_k(x'), \quad (14)$$

where $v_k(x')$ is the estimated velocity in the kth iteration for the point x', $\gamma_k(x') = -g(x')$ is the steepest descent direction of the objective function in Equation (1), and $\alpha_k$ is a step length in the kth iteration and can be obtained by a line search method or the methods.

At block 216, the iteration counter k is increased by one, and method 200 returns to block 206 to compute synthetic data traces using the estimated velocities obtained in the last iteration to iteratively update velocities.

After final velocities have been found at block 218, a 3D velocity model can be generated by including final velocities at designated points representing the target region. In some cases, the 3D velocity model can be used to generate a seismic image of the target region. The seismic image can indicate subsurface geologic features and be used for effective oil and gas exploration, such as identifying potential locations of hydrocarbon wells and determining drilling parameters for the hydrocarbon wells. The seismic image and the drilling parameters can be displayed on a user interface.

Figure 3:
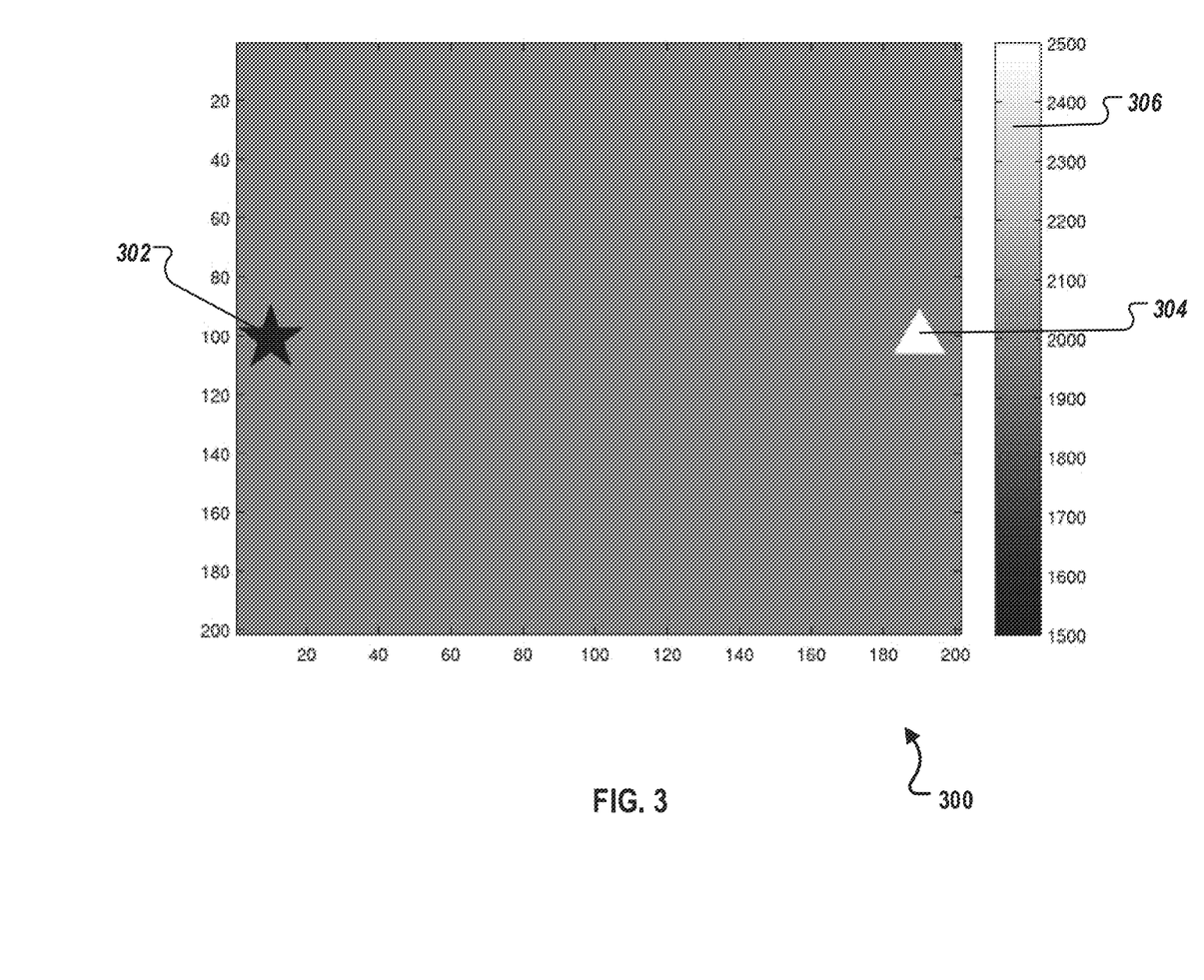
FIG. 3 illustrates a true velocity model, according to some implementations.

FIG. 3 illustrates a true velocity model 300, according to some implementations. A numerical experiment has been performed using the described approach. A simple model of one source 302 and one receiver 304 is used in the numerical experiment. The 2-D target region in the experiment is 2 km long by 2 km wide. Using a spacing of 10 m, the target region can be divided into 201×201 grids and represented by 201×201 points. The horizontal and vertical axis in FIG. 3 represent a grid index in x and y direction, respectively. The source 302 is at a location of (0.1 km, 1.0 km) and the receiver 304 is at a location of (1.9 km, 1.0 km). Bar 306 depicts a mapping between gray-scale colors and a continuous range of a velocity value. The velocity model 300 is a constant velocity model where the velocity is 2000 meter/second.

Figure 4A:
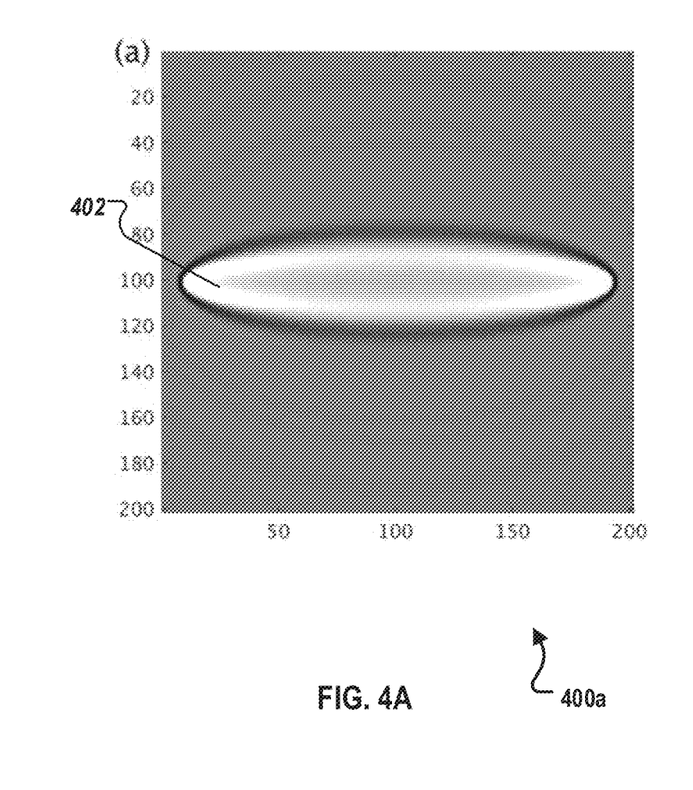
FIGS. 4A-4B illustrate computed gradients, according to some implementations.
Figure 4B:
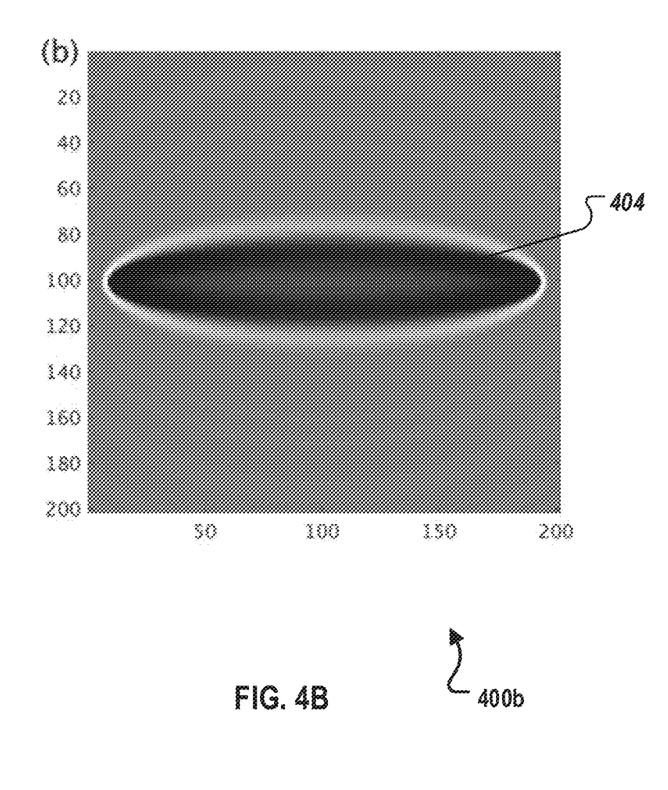

FIGS. 4A-4B illustrate computed gradients 400a and 400b, according to some implementations. Gradients 400a and 400b are computed using Equation (8) for the target region, source, and receiver illustrated in FIG. 3. Gradients 400a and 400b illustrate gradients of the 201×201 points in the target region when initial estimated velocities are lower and higher than true velocities, respectively. In FIGS. 4A and 4B, white color area 402 denotes negative gradients, while black color area 404 denotes positive gradients. The two opposite gradient signs correctly indicate the opposite velocity errors since the initial estimated velocities in FIG. 4A are lower than the true velocities while the initial estimated velocities in FIG. 4B are higher than the true velocities.

Figure 5A:
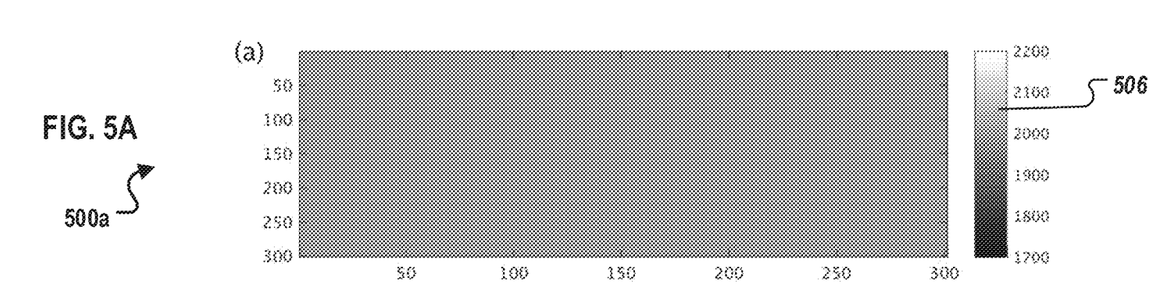
FIGS. 5A-5C illustrate using the described approach on a Gaussian model, according to some implementations.
Figure 5B:
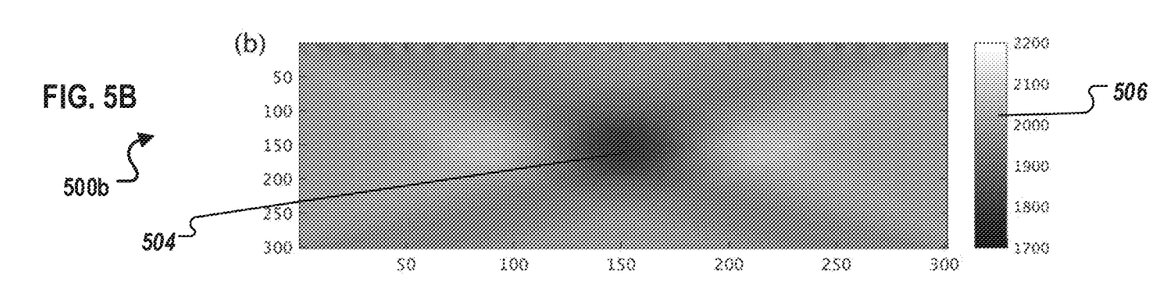
Figure 5C:
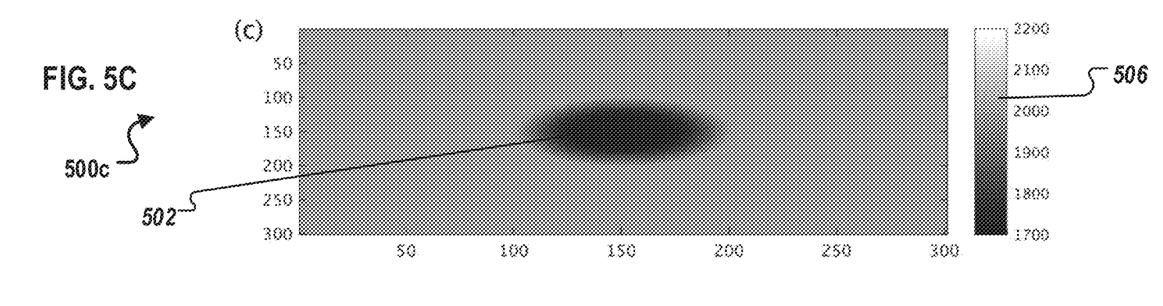

FIGS. 5A-5C illustrate using the described approach on a Gaussian model, according to some implementations. The 2-D target region is 3 km long and 3 km deep. In the numerical test, the target region is divided into 301×301 grids using a spacing of 10 m. The horizontal and vertical axis in FIGS. 5A-5C represent a grid index in the respective directions. Bar 506 depicts a mapping between gray-scale colors and a continuous range of a velocity value. In the test, 31 shots are evenly distributed on the top. For each shot, 301 receivers are placed on the bottom. The shot spacing and receiver spacing is 100 m and 10 m, respectively. A Ricker wavelet is used as the source waveform with a dominant frequency of 10 Hz. FIG. 5A shows an initial velocity model 500a including a constant velocity 2 km/s. FIG. 5C show a true velocity model 500c including a uniform background velocity 2 km/s and a low velocity anomaly 502 with an average velocity 1.7 km/s. FIG. 5B shows the final velocity model obtained by the described approach where an anomaly 504 is roughly recovered in the center.

Figure 6:
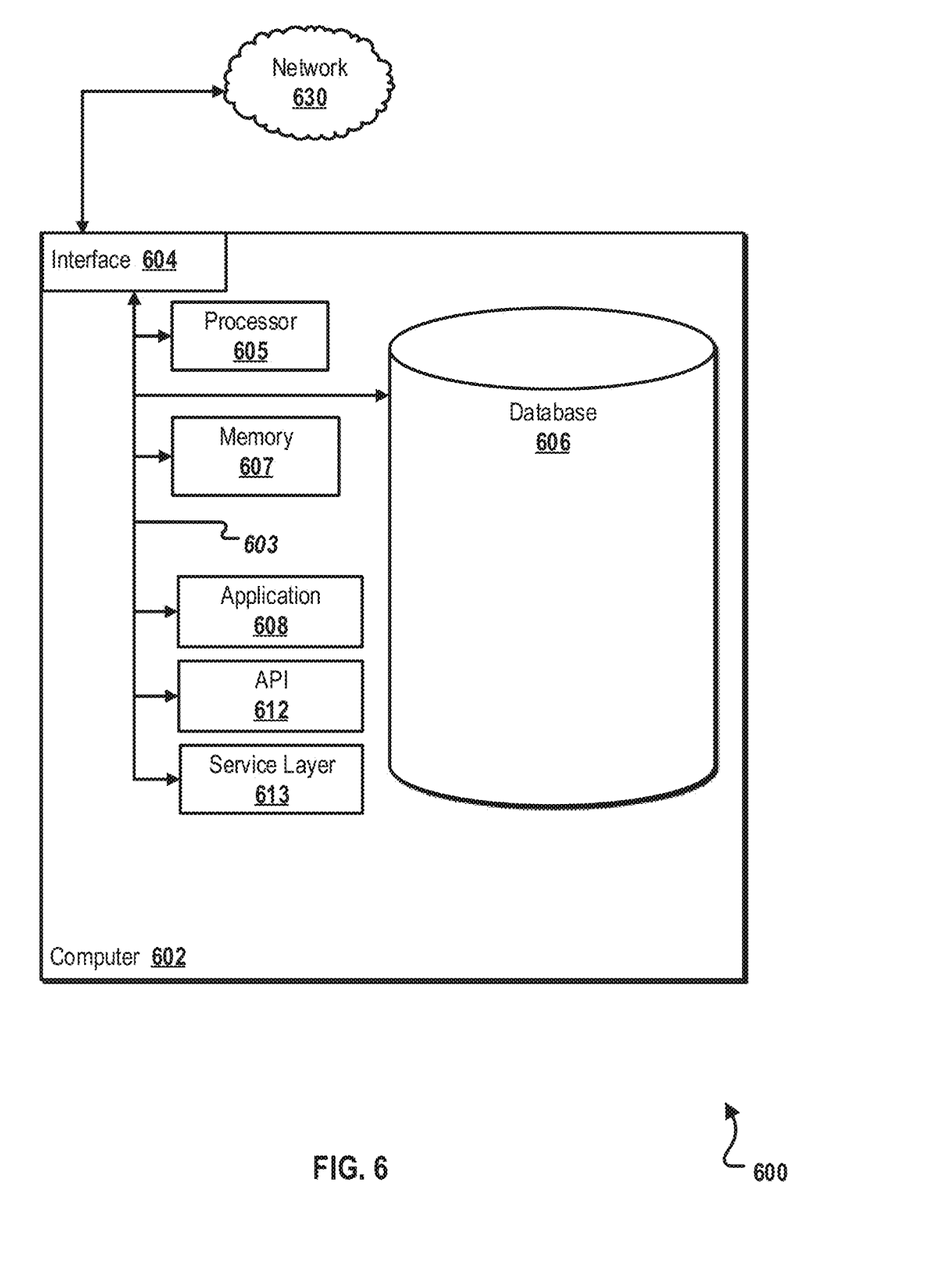
FIG. 6 is a block diagram illustrating an example computer system used to provide computational functionalities associated with described algorithms, methods, functions, processes, flows, and procedures as described in the instant disclosure, according to some implementations.

FIG. 6 is a block diagram of an example computer system 600 used to provide computational functionalities associated with described algorithms, methods, functions, processes, flows, and procedures as described in the instant disclosure, according to some implementations. The illustrated computer 602 is intended to encompass any computing device such as a server, desktop computer, laptop/notebook computer, wireless data port, smart phone, personal data assistant (PDA), tablet computing device, or one or more processors within these devices, including physical or virtual instances (or both) of the computing device. Additionally, the computer 602 may comprise a computer that includes an input device, (such as a keypad, keyboard, or touch screen that can accept user information), and an output device that conveys information associated with the operation of the computer 602 (for example, conveying digital data, visual, or audio information (or a combination of information) on a graphical user interface (GUI)).

The computer 602 can serve in a role as a client, network component, a server, a database, or a combination of roles for performing the subject matter described in the instant disclosure. The illustrated computer 602 is communicably coupled with a network 630. In some implementations, one or more components of the computer 602 may be configured to operate within environments, including cloud-computing-based, local, global, or a combination of environments.

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or a combination of servers.

The computer 602 can receive requests over network 630 from a client application (for example, executing on another computer 602) and responding to the received requests by processing the received requests using an appropriate software application(s). In addition, requests may also be sent to the computer 602 from internal users (for example, from a command console), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or a combination of computing languages providing data in extensible markup language (XML) format or a combination of formats. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory or conventional database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. For example, the database 606 can hold seismic data.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Described implementations of the subject matter can include one or more features, alone or in combination.

For example, in a first implementation, a method including receiving seismic data associated with a region. The region comprises one or more earth subsurface layers represented by a plurality of points, and each point is associated with a seismic velocity. Seismic velocities at the plurality of points are determined by iteratively updating the seismic velocities based on a plurality of gradient values, where each gradient value corresponds to a point and is determined by evaluating a gradient of an objective function at a location of the point. A seismic image of the one or more earth subsurface layers is displayed based on the determined seismic velocities.

The foregoing and other described implementations can each, optionally, include one or more of the following features:

A first feature, combinable with any of the following features, where the method further comprises determining an initial seismic velocity at each point based on an NMO velocity.

A second feature, combinable with any of the previous or following features, where iteratively updating the seismic velocities further comprises determining synthetic seismic data to be used in an iteration based on seismic velocities at the plurality of points determined from a last iteration.

A third feature, combinable with any of the previous or following features, where the objective function is $$J = \frac{1}{2}\sum_{x_s,x,\omega}\left|\frac{\partial \overline{C}}{\partial \omega}\right|^2,$$

where $\overline{C}(x,\omega;x_s)=d^*(x,\omega;x_s)p(x,\omega;x_s)$, $d(x,\omega;x_s)$ represents the received seismic data at a source location $x_s$ and a receiver location x, $p(x,\omega;x_s)$ represents the synthetic seismic data, * represents a conjugate operation, and $\omega$ is an angular frequency.

A fourth feature, combinable with any of the previous or following features, where iteratively updating the seismic velocities further comprises stopping iteration if a value of the objective function is less than a predetermined threshold.

A fifth feature, combinable with any of the previous or following features, where the seismic velocities are iteratively updated using a steepest descent method.

A sixth feature, combinable with any of the previous features, where the gradient of the objective function is independent of amplitude changes of the seismic data with respect to the location of the point.

In a second implementation, a system comprising a computer memory, and one or more hardware processors interoperably coupled with the computer memory. The one or more hardware processors are configured to perform operations including receiving seismic data associated with a region. The region comprises one or more earth subsurface layers represented by a plurality of points, and each point is associated with a seismic velocity. Seismic velocities at the plurality of points are determined by iteratively updating the seismic velocities based on a plurality of gradient values, where each gradient value corresponds to a point and is determined by evaluating a gradient of an objective function at a location of the point. A seismic image of the one or more earth subsurface layers is displayed based on the determined seismic velocities.

The foregoing and other described implementations can each, optionally, include one or more of the following features:

A first feature, combinable with any of the following features, where the operations further comprise determining an initial seismic velocity at each point based on an NMO velocity.

A second feature, combinable with any of the previous or following features, where iteratively updating the seismic velocities further comprises determining synthetic seismic data to be used in an iteration based on seismic velocities at the plurality of points determined from a last iteration.

A third feature, combinable with any of the previous or following features, where the objective function is $$J = \frac{1}{2}\sum_{x_s,x,\omega}\left|\frac{\partial \overline{C}}{\partial \omega}\right|^2,$$

wherein $\overline{C}(x,\omega;x_s)=d^*(x,\omega;x_s)p(x,\omega;x_s)$, $d(x,\omega;x_s)$ represents the received seismic data at a source location $x_s$ and a receiver location x, $p(x,\omega;x_s)$ represents the synthetic seismic data, * represents a conjugate operation, and $\omega$ is an angular frequency.

A fourth feature, combinable with any of the previous or following features, where iteratively updating the seismic velocities further comprises stopping iteration if a value of the objective function is less than a predetermined threshold.

A fifth feature, combinable with any of the previous or following features, where the seismic velocities are iteratively updated using a steepest descent method.

A sixth feature, combinable with any of the previous features, where the gradient of the objective function is independent of amplitude changes of the seismic data with respect to the location of the point.

In a third implementation, a non-transitory, computer-readable medium storing one or more instructions executable by a computer system to perform operations including receiving seismic data associated with a region. The region comprises one or more earth subsurface layers represented by a plurality of points, and each point is associated with a seismic velocity. Seismic velocities at the plurality of points are determined by iteratively updating the seismic velocities based on a plurality of gradient values, where each gradient value corresponds to a point and is determined by evaluating a gradient of an objective function at a location of the point. A seismic image of the one or more earth subsurface layers is displayed based on the determined seismic velocities.

The foregoing and other described implementations can each, optionally, include one or more of the following features:

A first feature, combinable with any of the following features, where the operations further comprise determining an initial seismic velocity at each point based on an NMO velocity.

A second feature, combinable with any of the previous or following features, where iteratively updating the seismic velocities further comprises determining synthetic seismic data to be used in an iteration based on seismic velocities at the plurality of points determined from a last iteration.

A third feature, combinable with any of the previous or following features, where the objective function is $$J = \frac{1}{2}\sum_{x_s,x,\omega}\left|\frac{\partial \overline{C}}{\partial \omega}\right|^2,$$

wherein $\overline{C}(x,\omega;x_s)=d^*(x,\omega;x_s)p(x,\omega;x_s)$, $d(x,\omega;x_s)$ represents the received seismic data at a source location $x_s$ and a receiver location x, $p(x,\omega;x_s)$ represents the synthetic seismic data, * represents a conjugate operation, and $\omega$ is an angular frequency.

A fourth feature, combinable with any of the previous or following features, where iteratively updating the seismic velocities further comprises stopping iteration if a value of the objective function is less than a predetermined threshold.

A fifth feature, combinable with any of the previous features, where the gradient of the objective function is independent of amplitude changes of the seismic data with respect to the location of the point.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or a combination of operating systems.

A computer program, which may also be referred to or described as a program, software, a software application, a module, a software module, a script, or code can be written in any form of programming language, including compiled or interpreted languages, or declarative or procedural languages. The computer program can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices (for example, erasable programmable read-only memory (EPROM), electrically erasable programmable read-only memory (EEPROM), and flash memory devices), magnetic disks (for example, internal hard disks or removable disks), magneto-optical disks, and optical memory devices (for example, CD-ROM, DVD+/−R, DVD-RAM, and DVD-ROM disks). The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component (for example, as a data server), or that includes a middleware component (for example, an application server), or that includes a front-end component (for example, a client computer having a graphical user interface or a Web browser through which a user can interact with an implementation of the subject matter described in this specification), or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or a combination of communication networks. The network may communicate data between network addresses, for example, Internet Protocol (IP) packets, Frame Relay frames, Asynchronous Transfer Mode (ATM) cells, voice, or video.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations of particular concepts. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations. It should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

The invention claimed is:

1. A method, comprising:
receiving seismic data associated with a region, wherein the region comprises one or more earth subsurface layers represented by a plurality of points, and each point is associated with a seismic velocity;
determining seismic velocities at the plurality of points by iteratively updating the seismic velocities based on a plurality of gradient values;
determining synthetic seismic data to be used in an iteration based on seismic velocities at the plurality of points determined from a last iteration, wherein each gradient value corresponds to a point and is determined by evaluating a gradient of an objective function at a location of the point, and wherein:
the objective function is $$J = \frac{1}{2} \sum_{x_s,x,\omega} \left| \frac{\partial \overline{C}}{\partial \omega} \right|^2,$$

$\overline{C}(x,\omega,x_s) = d^*(x,\omega,x_s)p(x,\omega, x_s), d(x,\omega,x_s)$ represents received seismic data at a receiver location x due to activation of a source at a source location $x_s$, $p(x, \omega, x_s)$ represents the synthetic seismic data, * represents a conjugate operation, ω is an angular frequency, and
displaying a seismic image of the one or more earth subsurface layers based on the determined seismic velocities.

2. The method of claim 1, further comprising determining an initial seismic velocity at each point based on a normal moveout (WO) velocity.

3. The method of claim 1, wherein iteratively updating the seismic velocities further comprises stopping iteration if a value of the objective function is less than a predetermined threshold.

4. The method of claim 1, wherein the seismic velocities are iteratively updated using a steepest descent method.

5. The method of claim 1, wherein the gradient of the objective function is independent of amplitude changes of the seismic data with respect to the location of the point.

6. A system, comprising:
a computer memory; and
one or more processors interoperably coupled with the computer memory and configured to perform operations comprising:
receiving seismic data associated with a region, wherein the region comprises one or more earth subsurface layers represented by a plurality of points, and each point is associated with a seismic velocity;
determining seismic velocities at the plurality of points by iteratively updating the seismic velocities based on a plurality of gradient values;
determining synthetic seismic data to be used in an iteration based on seismic velocities at the plurality of points determined from a last iteration, wherein each gradient value corresponds to a point and is determined by evaluating a gradient of an objective function at a location of the point, and wherein:
the objective function is $$J = \frac{1}{2} \sum_{x_s,x,\omega} \left| \frac{\partial \overline{C}}{\partial \omega} \right|^2,$$

$\overline{C}(x,\omega,x_s) = d^*(x,\omega,x_s) \ p(x,\omega,x_s), \ d(x,\omega,x_s)$ represents received seismic data at a receiver location x due to activation of a source at a source location $x_s$, $p(x, \omega, x_s)$ represents the synthetic seismic data, * represents a conjugate operation, and ω is an angular frequency; and
displaying a seismic image of the one or more earth subsurface layers based on the determined seismic velocities.

7. The system of claim 6, wherein the operations further comprise determining an initial seismic velocity at each point based on a normal moveout (NMO) velocity.

8. The system of claim 6, wherein iteratively updating the seismic velocities further comprises stopping iteration if a value of the objective function is less than a predetermined threshold.

9. The system of claim 6, wherein the seismic velocities are iteratively updated using a steepest descent method.

10. The system of claim 6, wherein the gradient of the objective function is independent of amplitude changes of the seismic data with respect to the location of the point.

11. A non-transitory, computer-readable medium storing one or more instructions executable by a computer system to perform operations comprising:
receiving seismic data associated with a region, wherein the region comprises one or more earth subsurface layers represented by a plurality of points, and each point is associated with a seismic velocity;
determining seismic velocities at the plurality of points by iteratively updating the seismic velocities based on a plurality of gradient values;
determining synthetic seismic data to be used in an iteration based on seismic velocities at the plurality of points determined from a last iteration, wherein each gradient value corresponds to a point and is determined by evaluating a gradient of an objective function at a location of the point, and wherein:
the objective function is $$J = \frac{1}{2} \sum_{x_s,x,\omega} \left| \frac{\partial \overline{C}}{\partial \omega} \right|^2,$$

$\overline{C}(x,\omega,x_s) = d^*(x,\omega,x_s)p(x,\omega, x_s), d(x,\omega,x_s)$ represents received seismic data at a receiver location x due to activation of a source at a source location $x_s$, $p(x,\omega, x_s)$ represents the synthetic seismic data, * represents a conjugate operation, ω is an angular frequency; and
displaying a seismic image of the one or more earth subsurface layers based on the determined seismic velocities.

12. The non-transitory, computer-readable medium of claim 11, wherein the operations further comprise determining an initial seismic velocity at each point based on a normal moveout (NMO) velocity.

13. The non-transitory, computer-readable medium of claim 11, wherein iteratively updating the seismic velocities further comprises stopping iteration if a value of the objective function is less than a predetermined threshold.

14. The non-transitory, computer-readable medium of claim 11, wherein the gradient of the objective function is independent of amplitude changes of the seismic data with respect to the location of the point.

* * * * *

UNITED STATES PATENT AND TRADEMARK OFFICE
CERTIFICATE OF CORRECTION

PATENT NO. : 11,269,097 B2
APPLICATION NO. : 15/956261
DATED : March 8, 2022
INVENTOR(S) : Wu et al.

It is certified that error appears in the above-identified patent and that said Letters Patent is hereby corrected as shown below:

In the Claims

Column 17, Line 20, Claim 1, delete "$\bar{C}(x,\omega,x_s)=d^*(x,\omega,x_s)p(x,\omega, x_s),d(x,\omega,x_s)$" and insert -- $\bar{C}(x,\omega;x_s)=d^*(x,\omega;x_s|)p(x,\omega;x_s), d(x,\omega;x_s)$ --;

Column 17, Line 22, Claim 1, delete "$x_s, p(x, \omega, x_s)$" and insert -- $x_s, p(x,\omega;x_s)$ --;

Column 17, Line 24, Claim 1, before "$\omega|$" insert -- and --;

Column 17, Line 24, Claim 1, delete "frequency, and" and insert -- frequency; and --;

Column 17, Line 30, Claim 2, delete "(WO)" and insert -- (NMO) --;

Column 17, Line 62 (approx.), Claim 6, delete "$\bar{C}(x,\omega,x_s)=d^*(x,\omega,x_s) p(x,\omega,x_s), d(x,\omega,x_s)$" and insert -- $\bar{C}(x,\omega;x_s)=d^*(x,\omega;x_s|)p(x,\omega;x_s), d(x,\omega;x_s)$ --;

Column 17, Line 64 (approx.), Claim 6, delete "$x_s, p(x, \omega, x_s)$" and insert -- $x_s, p(x,\omega;x_s)$ --;

Column 18, Line 43 (approx.), Claim 11, delete "$\bar{C}(x,\omega,x_s)=d^*(x,\omega,x_s)p(x,\omega,x_s),d(x,\omega,x_s)$" and insert -- $\bar{C}(x,\omega;x_s)=d^*(x,\omega;x_s|)p(x,\omega;x_s), d(x,\omega;x_s)$ --;

Column 18, Line 45 (approx.), Claim 11, delete "$x_s, p(x, \omega, x_s)$" and insert -- $x_s, p(x,\omega;x_s)$ --;

Column 18, Line 47, Claim 11, before "$\omega|$" insert -- and --.

Signed and Sealed this
Nineteenth Day of July, 2022

*Katherine Kelly Vidal*
*Director of the United States Patent and Trademark Office*